United States Patent
Ma et al.

(10) Patent No.: US 12,104,854 B2
(45) Date of Patent: Oct. 1, 2024

(54) THREE-PHASE OSCILLATING HEAT PIPE

(71) Applicant: The Curators of the University of Missouri, Columbia, MO (US)

(72) Inventors: Hongbin Ma, Columbia, MO (US); Michael Merwin, Columbia, MO (US); Adalberto Aviles, Columbia, MO (US); Tingting Hao, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 727 days.

(21) Appl. No.: 16/904,876

(22) Filed: Jun. 18, 2020

(65) Prior Publication Data

US 2020/0400380 A1 Dec. 24, 2020

Related U.S. Application Data

(60) Provisional application No. 62/862,848, filed on Jun. 18, 2019.

(51) Int. Cl.
*F28D 15/02* (2006.01)
*F28F 13/10* (2006.01)
*F28F 23/00* (2006.01)

(52) U.S. Cl.
CPC .......... *F28D 15/0266* (2013.01); *F28F 13/10* (2013.01); *F28F 23/00* (2013.01)

(58) Field of Classification Search
CPC ........ F28D 15/0266; F28F 13/10; F28F 23/00
USPC .................................................. 165/104.13
See application file for complete search history.

(56) References Cited

U.S. PATENT DOCUMENTS

| | | | |
|---|---|---|---|
| 7,923,112 B2* | 4/2011 | Christ | C09K 5/063 428/408 |
| 9,033,027 B2* | 5/2015 | Tantolin | F28D 15/06 165/104.26 |
| 9,318,681 B2 | 4/2016 | Gavillet | |

OTHER PUBLICATIONS

Arulmurugan, L., et al., "Enhancement of Heat Transfer Using Phase Change Material with Water Mixture," 2017, J. Ovonic Research, 13/6:299-305.
Feng, J., et al., "Heat Transfer Performance of Three-Phase Flow Closed Gravity Heat Pipe," 2013, J. Tianjin University (Science and Technology), 46/6:553-558. Abstract only.
Hossain, R., et al., "Energy Storage System Based on Nanoparticle-Enhanced Phase Change Material Inside Porous Medium," 2015, Int'l J. Thermal Sciences, 91:49-58.
Huminic, G., et al., "Experimental Study of the Thermal Performance of Thermosyphon Heat Pipe Using Iron Oxide Nanoparticles," 2011, Int'l J. Heat and Mass Transfer, 54:656-661.
Jiang, F., et al., "Heat Transfer Enhancement in a Three-Phase Closed Thermosyphon," 2014, Applied Thermal Engineering, 65:495-501.

(Continued)

*Primary Examiner* — Jon T. Schermerhorn, Jr.
(74) *Attorney, Agent, or Firm* — Stinson LLP

(57) ABSTRACT

The present disclosure generally provides an oscillating heat pipe, wherein the oscillating heat pipe comprises a 3-phase working fluid that includes at least one liquid phase portion, at least one vapor phase portion, and at least one solid phase portion, wherein in addition to a phase change between liquid and vapor, there is also a phase change from solid to liquid during a heat transfer process involving the oscillating heat pipe.

19 Claims, 7 Drawing Sheets

(56) References Cited

OTHER PUBLICATIONS

Kibria, M.A., et al., "A Review on Thermophysical Properties of Nanoparticle Dispersed Phase Change Materials," 2015, Energy Conversion and Management, 95:69-89.

Li, Z., et al., "Experimental and Numerical Study on the Effective Thermal Conductivity of Paraffin/Expanded Graphite Composite," 2014, Solar Energy Materials & Solar Cells, 128:447-455.

Naghavi, M.S., et al., "A State-of-the-Art Review on Hybrid Heat Pipe Latent Heat Storage Systems," 2015, Energy Conversion and Management, 105:1178-1204.

Naghavi, M.S., et al., "Theoretical Model of an Evacuated Tube Heat Pipe Solar Collector Integrated with Phase Change Material," 2015, Energy, 91:911-924.

Oya, T., et al., "Thermal Conductivity Enhancement of Erythritol as PCM by Using Graphite and Nickel Particles," 2013, Applied Thermal Engineering, 61:825-828.

Palomo Del Barrio, E., et al., "Characterization of Different Sugar Alcohols as Phase Change Materials for Thermal Energy Storage Applications," 2017, Solar Energy Materials & Solar Cells, 159:560-569.

Robak, C.W., et al., "Enhancement of Latent Heat Energy Storage Using Embedded Heat Pipes," 2011, Int'l J. Heat and Mass Transfer, 54:3476-3484.

Saikrishnan, V., et al., "Thermal Behaviour Study of Phase Change Material of a Latent Heat Storage System," 2016, Materials Today: Proceedings, 3:2518-2524.

Wang, Q., et al., "Thermal Performance of Phase Change Material/Oscillating Heat Pipe-Based Battery Thermal Management System," 2016, Int'l J. Thermal Sciences, 102:9-16.

Wu, W., et al., "Experimental Investigation on the Thermal Performance of Heat Pipe-Assisted Phase Change Material Based Battery Thermal Management System," 2017, Energy Conversion and Management, 138:486-492.

Zhao, J., et al., "Experimental Investigation on Thermal Performance of Phase Change Material Coupled with Closed-Loop Oscillating Heat Pipe (PCM/CLOHP) Used in Thermal Management," 2016, Applied Thermal Engineering, 93:90-100.

Zhong, L., et al., "Preparation and Thermal Properties of Porous Heterogeneous Composite Phase Change Materials Based on Molten Salts/Expanded Graphite," 2014, Solar Energy, 107:63-73.

* cited by examiner

THREE-PHASE OSCILLATING HEAT PIPE

FIELD

The present teachings relate to oscillating heat pipes.

BACKGROUND

The statements in this section merely provide background information related to the present disclosure and may not constitute prior art.

Thermal management technologies have been given significant attention with the development of electronic components. More efficient cooling devices need to be developed to remove an increasingly high heat flux exhibited by these components. One device suitable for such a situation is an oscillating heat pipe. Oscillating heat pipes (OHPs) serve as a self-sustained driving device through the pressure differences between the evaporator and condenser. These pressure differences are due to the phase change(s) occurring within the microchannels of the OHP. Combining the phase change heat transfer and oscillating flow in the microchannels, OHPs exhibit an exceedingly high heat transfer capacity as compared to traditional heat pipes. OHPs have been used in many fields, such as electronics cooling, solar collection, and heat exchanger. However, there remains a need in the industry to develop OHPs having different working fluids present within the microchannels and OHPs exhibiting enhanced results over those previously used in the field.

SUMMARY OF THE INVENTION

In one aspect, the present invention is directed to an oscillating heat pipe system. The heat pipe system comprises a pipe defining a heat pipe channel and in thermal contact with an evaporator and a condenser; and a working fluid disposed within the heat pipe channel. The working fluid comprises a solid phase change material, a liquid carrier, and a vapor. The working fluid absorbs thermal energy in the evaporator, thereby heating the working fluid, at least a portion of the solid phase change material changes state to a liquid phase change material, and at least a portion of the liquid carrier evaporates and forms vapor. The working fluid also releases thermal energy in the condenser, thereby cooling the working fluid, at least a portion of the vapor condenses, and at least a portion of the liquid phase change material solidifies.

In another embodiment, the liquid carrier in the working fluid disposed within the heat pipe channel comprises a solvent. Upon heating the working fluid in the evaporator, at least a portion of the solid phase change material dissolves in the solvent as a solute, the liquid phase change material comprising the solute. Further, upon cooling the working fluid in the condenser, at least a portion of the solute precipitates as a solid in the heat pipe channel.

In another embodiment, upon heating the working fluid in the evaporator, at least a portion of the solid phase change material melts to form the liquid phase change material and upon cooling the working fluid in the condenser, at least a portion of the liquid phase change material in the heat pipe channel is solidified.

Another aspect of the present invention is directed to a process for preparing an oscillating heat pipe. The process comprises preparing a plurality of interconnected heat pipe channels, applying pressure to form at least a partial vacuum within the plurality of channels, wherein the pressure within the channels is about 0.3 Torr or less, and charging a working fluid into the plurality of channels. The working fluid comprises a solid phase change material, a liquid carrier, and a vapor. Upon heating the working fluid in the evaporator, thermal energy is absorbed and at least a portion of the solid phase change material changes state to a liquid phase change material, and at least a portion of the liquid carrier evaporates and forms a vapor. Further, upon cooling the working fluid in the condenser, thermal energy is released and at least a portion of the vapor condenses, and at least a portion of the liquid phase change material precipitates/solidifies as a solid.

A further aspect of the present invention is directed to an oscillating heat pipe comprising a 3-phase working fluid. The 3-phase working fluid comprises at least one liquid phase portion, at least one vapor phase portion, and at least one solid phase portion, wherein the solid phase portion comprises a solute.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DETAILED DESCRIPTION OF THE INVENTION

Figure 1:
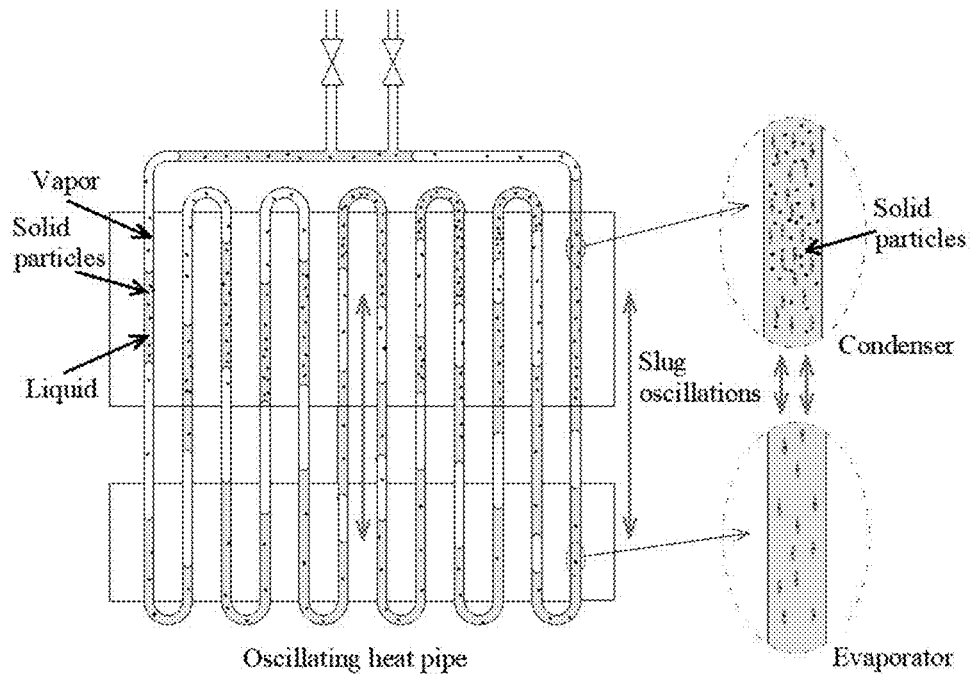
FIG. 1 is an exemplary schematic of oscillating heat pipe with vapor-liquid-solid phase working fluid at the working stage, in accordance with various embodiments of the present disclosure.

Provided herein is an improved oscillating heat pipe (referred to herein as an "OHP" or "OHPs") comprising a working fluid and processes for preparing an oscillating heat pipe.

An OHP consists of a series of connected pipes defining channels or microchannels in which a working fluid is sealed. Within an OHP system, the pipe is in thermal contact with an evaporator and a condenser. The evaporator or evaporator section represents or is in thermal contact with the device or environment to be cooled and the condenser or condenser section serves as the heat sink to which the thermal energy absorbed by the working fluid during operation is released. The dimensions, materials and construction of an OHP system can vary considerably depending on the specific application as understood by those skilled in the art.

Physical properties of the working fluid such as thermal conductivity, surface tension, latent heat, and viscosity affect the heat transfer performance of OHPs. Theoretical results have shown that most of the heat is transferred by sensible heat through the oscillating flow in an OHP. Evaporation and condensation are mainly used to produce the driving force. Working fluids with low latent heat, low viscosity, and low surface tension are beneficial for the startup performance of OHPs. For example, the startup performance of acetone-filled OHP is higher than the water-filled OHP due to the high dP/dT and relatively low latent heat of acetone. At low heat input, the heat transfer performance of acetone-filled OHP is better than water-filled OHP; however, a water-filled OHP is better than an acetone-filled OHP at high heat input. A working fluid with low latent heat is beneficial for the phase changes in the OHP to produce the high driving force of liquid slugs; however, the thermal conductivity of low latent heat working fluids is typically relatively low. To improve the drawback of pure working fluid, binary mixtures are sometimes added to improve the working fluid. Nanoparticles, ionic liquid, and surfactant can be added to further increase the OHP heat capability. A working fluid with nanoparticles can increase the heat transport capability in an OHP. Ionic liquid exhibits a high viscosity, high volumetric heat capacity, and low surface tension compared to water. Startup power and temperature difference between the evaporator and condenser decreased in OHPs with high mass fraction of ionic liquid. Surfactants have been observed to cause the thermal resistance of OHP to decrease, due to the reducing surface tension of water.

The present disclosure provides for an oscillating heat pipe (OHP) charged with a working fluid comprising three phases: solid, liquid, and gas (vapor). In a conventional OHP, the working fluid in the OHP changes phase between liquid and vapor during the heat transfer process. In the OHP described herein, in addition to a phase change between liquid and vapor, there is also a phase change from solid to liquid during the heat transfer process. In the evaporating section of the OHP, at least a portion of the liquid phase of the working fluid transitions to the vapor phase to produce the driving force. At the same time, at least a portion of the solid phase of the working fluid in the evaporator section transitions to the liquid phase to further increase the heat transport capability.

In accordance with the present invention, in one embodiment, the working fluid comprises a solid phase change material selected such that at least a portion of the solid phase change material melts under the prevailing conditions within the evaporator section of the OHP to form a liquid phase change material that subsequently solidifies under the prevailing conditions within the condenser section of the OHP. In accordance with another embodiment, the solid phase change material in the working fluid is selected such that at least a portion of the solid phase change material dissolves as a solute within the liquid phase of the working fluid under the prevailing conditions within the evaporator section of the OHP and subsequently solidifies (i.e., precipitates) under the prevailing conditions within the condenser section of the OHP. In this embodiment, at least a portion of the liquid phase present in the working fluid comprises a solvent in which at least a portion of the solid phase change material is dissolved during heat transfer operations.

As used herein, the term "phase change material" or "PCM" is understood to encompass a solid phase component of the working fluid, at least a portion of which melts and/or dissolves as a solute in the liquid phase of the working fluid as thermal energy is absorbed by the working fluid during heat transfer operations. Melting of the PCM and/or dissolution of the PCM within the liquid phase enhances the heat transport capability at the evaporator section of the OHP. Similarly, the solidification and/or precipitation/crystallization of the PCM in the condenser section enhances the heat transport capability in the condenser section of the OHP. The presence of a solid PCM in the 3-phase working fluid in accordance with the present invention also enhances the oscillating motion and heat transfer in the OHP.

Accordingly, the term "working fluid" as used herein refers to the material charged into and/or disposed within the channels defined by the pipe of the OHP, including the PCM, regardless of whether all or only a portion of the working fluid is present in a fluid (i.e., liquid or vapor) state. For example, at ambient conditions (e.g., standard conditions of 25° C. (298.15 K; 77° F.) and 100 kPa (1 bar; 14.504 psi)), the working fluid of the OHP described herein may be a heterogeneous mixture simultaneously comprising three phases: solid, liquid, and vapor. In another embodiment, at standard conditions, the working fluid comprises a homogeneous solution in which the PCM is present entirely as a liquid or as a solute in the liquid phase. In certain heat transfer operations, components of the working fluid in the OHP change phase between solid and liquid as well as between liquid and vapor. For example, in one embodiment during heat transfer operations, at least a portion of the PCM present in the working fluid changes phase between solid and liquid by melting or solidifying within the liquid phase of the working fluid or by dissolving in or precipitating from the liquid phase of the working fluid, while a portion of the liquid phase of the working fluid changes phase between liquid and vapor upon evaporation and condensation.

In one embodiment, at least a portion of the PCM present in a working fluid comprising a solvent is dissolved in and precipitated from the working fluid as the working fluid moves between the evaporator and condenser sections, respectively. In this embodiment, the working fluid is capable of absorbing and releasing additional heat through the heat of solution and the heat of precipitation of the PCM within the working fluid. When the phase change material/solute is dissolved into the solvent, two types of heat transfer processes occur. If the process absorbs energy, it is an endothermic process. If the process releases energy, it is an exothermic process. For the 3-phase OHP of the present disclosure, when the 3-phase working fluid flows into an evaporator section, where the temperature of the 3-phase working fluid at the respective evaporation section increases, at least a portion of the solute, i.e., phase change material, is dissolved in the solvent, and therefore, the process is endothermic. When the 3-phase working fluid flows into a condenser section, where the temperature of the 3-phase working fluid in the respective condenser section decreases, at least a portion of the solute, i.e., phase change material, precipitates from the solvent, and therefore, the process is exothermic.

Similarly, in another embodiment, at least a portion of the PCM present in the working fluid melts and solidifies as the working fluid moves between the evaporator and condenser sections, respectively. In this embodiment, the working fluid is capable of absorbing and releasing additional heat through the heat of fusion and heat of solidification of the PCM. For the 3-phase OHP of the present disclosure, when the 3-phase working fluid flows into an evaporator section, where the temperature of the 3-phase working fluid at the respective evaporation section increases, at least a portion of the PCM melts, and therefore, the process is endothermic. When the 3-phase working fluid flows into a condenser section, where the temperature of the 3-phase working fluid in the respective condenser section decreases, at least a portion of the PCM solidifies, and therefore, the process is exothermic.

Figure 3:
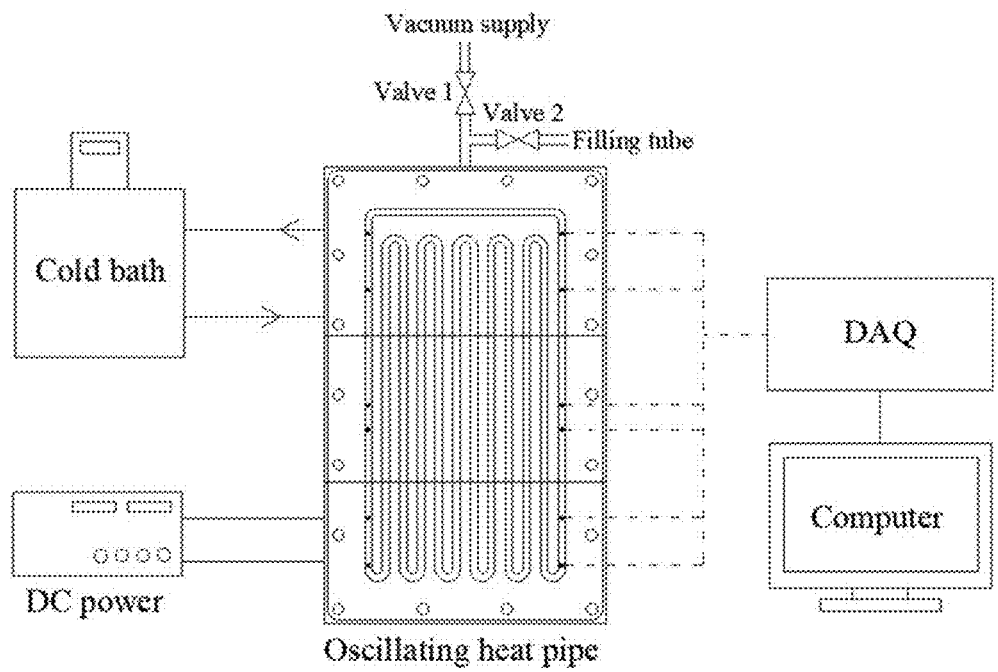
FIG. 3 is a schematic of the experimental setup, in accordance with various embodiments of the present disclosure.
Figure 4:
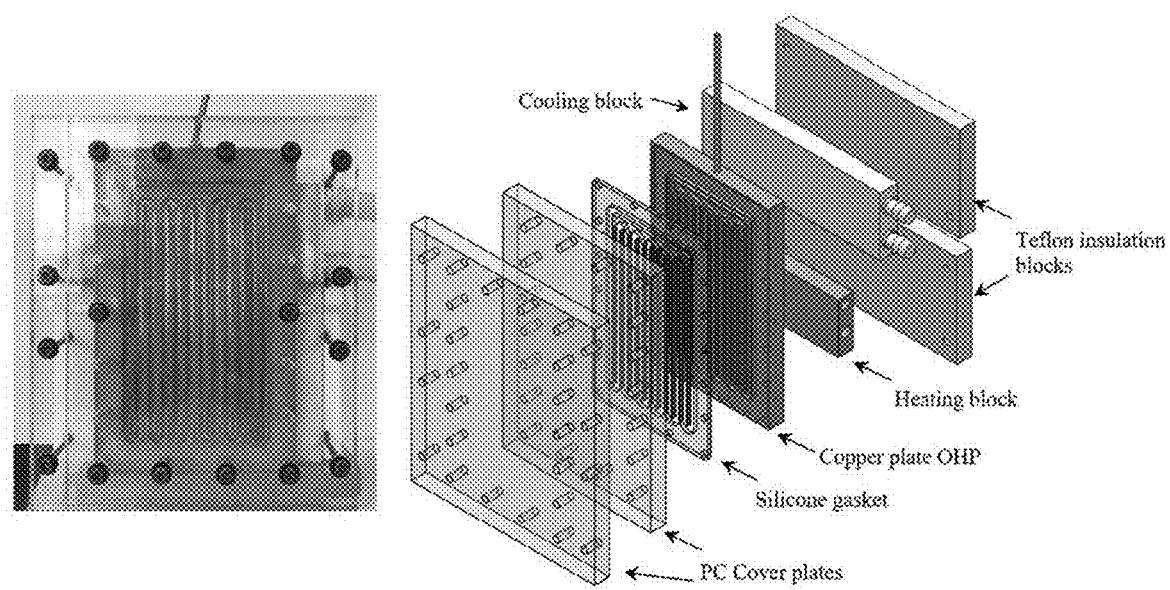
FIG. 4 is a photo and exploded view of the tested oscillating heat pipe, in accordance with various embodiments of the present disclosure.
Figure 5:
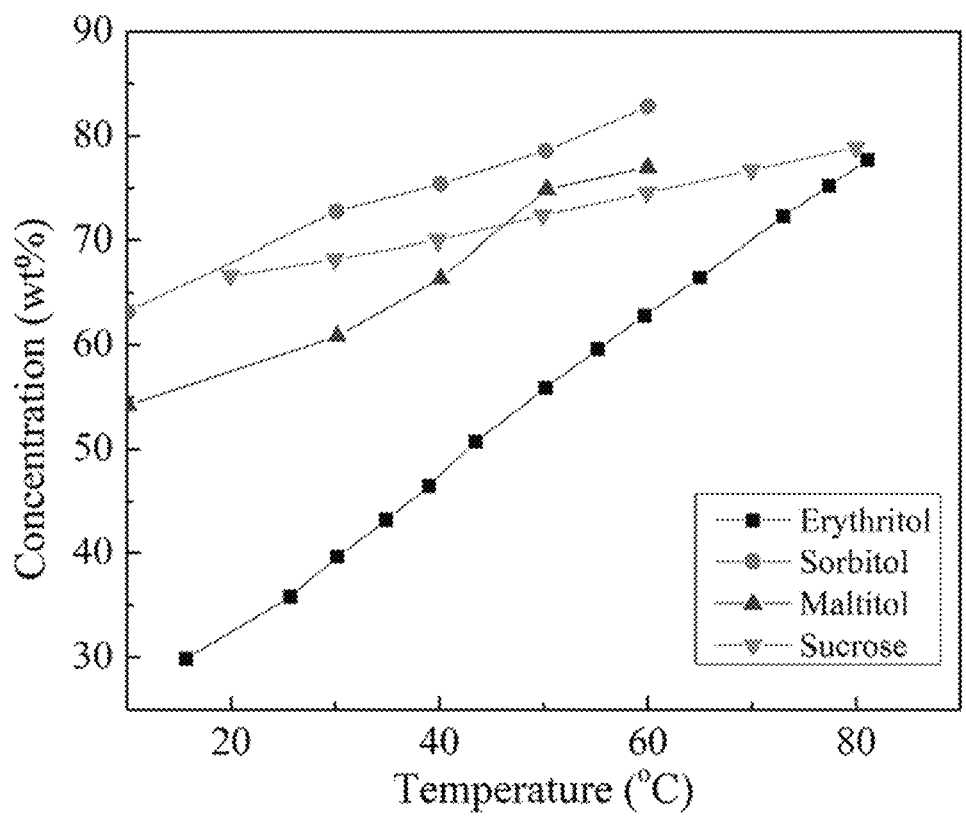
FIG. 5 is a graph illustrating a temperature effect on solubility of sugar alcohols and sucrose, in accordance with various embodiments of the present disclosure.

Referring to FIGS. 1, 3, and 4 the present invention provides, in one embodiment, an oscillating heat pipe (OHP) charged with a working fluid simultaneously comprising three phases. In particular, the working fluid may comprise at least one solid phase portion, at least one liquid phase portion, and at least one vapor phase portion, as shown, for example, in FIG. 1. One difference between known OHPs and the 3-phase OHP of the present inventions is the working fluid. For a typical known OHP, the working fluid comprises the two phases of liquid and vapor. However, in the 3-phase OHP of the present invention described herein, the working fluid comprises three phases, i.e., solid, liquid, and vapor. In the 3-phase OHP of the present invention, the solid phase change material in the working fluid can be melted and/or dissolved into the liquid phase. The ability to melt or dissolve depends on the temperature of the working fluid. When the 3-phase working fluid is in the evaporator section of the OHP, the temperature is relatively higher. The solid phase change material, e.g., the solute, can be dissolved more into the solvent or more readily melt. This directly increases the effective heat capacity of the working fluid and significantly increases the heat transport capability of the OHP. When the 3-phase working fluid flows into the condenser section, the phase change material, e.g., solute, precipitates out from the solvent because the condenser temperature is lower, causing over saturation of the solute/phase change material. Similarly, when the 3-phase working fluid flows into the condenser section, the phase change material, e.g., a solid that has been melted, can solidify because the condenser temperature is lower. During this process, more heat is released from the working fluid. In this way, more heat can be transported to the condenser section with the 3-phase working fluid OHP than with conventional OHPs. When the solid phase portion of working fluid (i.e., the phase change material) is in the form of particles or clusters of particles, the solid phase portion can easily break the thermal boundary layer, enhancing the heat transfer capability of the OHP. Therefore, in the above described system, more heat is released from the 3-phase working fluid resulting in a higher heat transport capability of 3-phase working fluid, and accordingly of the OHP as compared to conventional OHPs.

When heat is absorbed from a heat source at an evaporating section of the OHP, some of liquid phase portion of the working fluid in the evaporating section becomes vapor, and at the same time, the vapor phase portion is condensed into liquid in the condenser section. The evaporation and condensation results in the vapor volume expanding and contracting, which in turn produces a driving force for the working fluid. For a typical known OHP, heat is transported mainly by the sensible heat, and the heat transport capability largely depends on the heat capacity of the working fluid. Thus, the present invention has the added benefit of producing an increased driving force from the evaporation and condensation of the working fluid during operation.

Slug oscillations within three phases of working fluid can also enhance the heat transfer performance of the respective OHP, while preventing precipitate buildup along the OHP walls. As discussed above, dissolution is an endothermic process and crystallization/precipitation is an exothermic process. Likewise, melting is an endothermic process and solidification is an exothermic process. Therefore, the slugs absorb more heat in evaporator sections of the OHP and release more heat in condenser section of the OHP due to the lattice and hydration energy.

There are multiple considerations that must be taken into account when constructing the OHP of the present invention. The working fluid should be such that at least a portion of the liquid phase is capable of undergoing a phase change between liquid and vapor phases when the OHP is used to recover heat in the intended system. Likewise, the solid phase change material of the working fluid should be selected such that the phase change material is capable of undergoing a phase change between solid and liquid, whether by melting/solidification or by dissolution/precipitation under the prevailing operating conditions within the evaporator and condenser sections.

To this end, it will be recognized that the exact manner of construction and working fluid profile of an OHP of the present invention will depend upon the system in which it is intended to be used. For example, the diameter of the OHP, length of the OHP, melting temperature of the solid, vaporization temperature of the liquid, temperature of the evaporator, temperature of the condensers, temperature difference between evaporator and condenser temperature, pressure that the OHP can withstand, viscosity of the liquid, and surface state of the OHP (hydrophobicity/hydrophilicity) should all be carefully considered when constructing an OHP of the present invention.

An additional consideration when selecting the liquid phase portion and solid phase change material for the working fluid is the relative amounts of solid, liquid, and gas in the system during use. As discussed above, OHPs serve as a self-sustained driving device through the pressure differences between the evaporator and condenser, where the pressure differences are due to the phase change(s) occurring within the microchannels of the OHP. The components of the working fluid should be selected such that this pressure difference provides enough driving force to allow for the OHP to remain self-sustaining. For example, to sustain a desirable slug velocity, lower the frictional force and pressure drop, and/or produce functional oscillating fluid flow, the solid-to-liquid ratio should be kept appropriately adjusted. In one embodiment, this ratio is maintained sufficiently low to decrease the chances of clogging. However, the extent to which the microchannels of the OHP clog may depend on the physical construction of the OHP. The diameter, length, materials of construction, and surface state should be carefully selected in order to avoid or minimize clogging. For example, a large diameter OHP with short pipe length having a surface state causing fully wetted surfaces, in combination with a low viscosity working fluid, wherein the OHP exhibits a high slug velocity and high working pressure, will generally minimize clogging of the system to a commercially acceptable amount. It will be understood that the maximum working pressure of the OHP is determined by the operating temperature, dimensions, and materials of construction.

The phase change material and the liquid phase portion of the working fluid should be selected such that they do not experience chemical reactions that will be irreversible within the OHP, such as the oxidation of a metal or the generation of non condensable gas. The phase change material and the liquid phase portion of the working fluid should also be selected such that the system in which the OHP is intended to be used does not operate at a temperature high enough to thermally degrade the components of the working fluid.

In one embodiment, the working fluid ratio, or filling ratio, is at between about 20 vol % and about 80 vol %. Operating outside of these ranges may reduce the efficiency of the heat pipe or result in dry-out of the OHP. The efficiency or likelihood of dry-out will depends on the considerations set forth above (e.g., surface condition, working fluid composition, OHP dimensions, evaporator-to-condenser temperature difference, etc.).

Phase Change Material

Phase change materials (PCMs) are materials with high latent heat, which can be used in the latent heat thermal storage systems. PCMs absorb and release excessive amounts of energy during the process of phase change between solid and liquid phases with high fusion heat. As discussed above, the PCM used in the present invention may absorb and release the excess energy through the process of melting-solidification or through the process of dissolution-precipitation. Investigations show that heat pipes assisted by PCM can improve the overall heat transfer performance due to the high heat storage capacity of PCM.

Upon investigations it was determined that sugar alcohols are attractive PCMs for dissolution as a solute due to their low melting point and high fusion heat. Sugar alcohols, such as sorbitol and erythritol have a high negative heat of solution, which can provide a strong cooling effect. Erythritol is regarded as a promising PCM due to its environmentally friendly, non-toxic, and non-flammable characteristics. Erythritol has a melting point of 120° C. and latent heat of 340 J/g. However, the low thermal conductivity of erythritol limits its application. For this reason, an experiment was conducted where graphite and nickel particles were added into the erythritol. This resulted in the thermal conductivity of the phase change composite increasing by about 6.4 times as compared to pure erythritol. Erythritol dissolvability in water depends on the temperature of the working fluid. Convective heat transfer performance of erythritol solution with volume fractions less than 0.4% is higher than pure water in heat exchanger. Concentration of erythritol solution is an important factor on the properties of the mixture.

It was hypothesized that adding erythritol to the working fluid could increase the heat transport capability due to the high fusion heat of phase change material. However, the potential role of PCMs as a working fluid in OHPs has had very little coverage in the literature and needed further investigation. In the present invention, in one embodiment, the erythritol is added in water to form a working fluid for an OHP. Considering that the solubility of erythritol significantly increases with temperature, the erythritol can change phase from solid to liquid when it is moved from the condenser to the evaporator (i.e., dissolution), or from liquid to solid when it is moved from the evaporator to the condenser (i.e., solidification). An experimental investigation of OHP charged with an erythritol aqueous solution and effect of the erythritol concentration on the heat transfer performance is described in further detail below. It was expected that the oscillating motion generated in the OHP can fully take advantages of extra heat transport capability of a hybrid fluids containing solid, liquid, and vapor phases.

Figure 2:
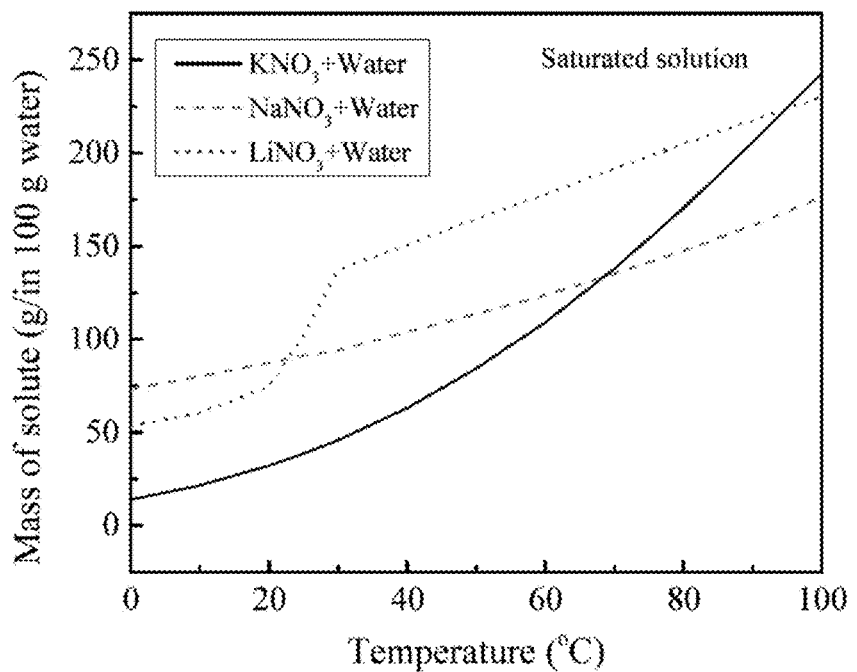
FIG. 2 is an exemplary graph illustrating the temperature effect on a working fluid having a phase change material comprising $NaNO_3$, $LiNO_3$, and $KNO_3$, in accordance with various embodiments of the present disclosure.

Phase change materials or solutes, such as $NaNO_3$, $LiNO_3$, $KNO_3$, and $C_4H_{10}O_4$ (erythritol), as exemplarily shown in FIG. 2 can be easily dissolved in water. When water is mixed with $NaNO_3$, $LiNO_3$, $KNO_3$, or erythritol, the working fluid can easily have the three phases of solid, liquid, and vapor. The solubility of the phase change materials/solutes in the 3-phase working fluid increases greatly with temperature. When the 3-phase working fluid is in an evaporator section, where the temperature is relatively higher, more solute, i.e., phase change material, will be dissolved in the evaporator section and less solute, i.e., phase change material, will be dissolved in the condenser section. In this way, the 3-phase working fluid will enhance the heat transport capability in the evaporator sections and condenser sections, respectively.

A suitable phase change material of the present invention may be selected based on the melting point of the material at standard conditions (i.e. 25° C. (298.15 K; 77° F.) and 100 kPa (1 bar; 14.504 psi)). For example, the phase change material of the present invention may have a melting point, at standard conditions, of about 25° C. or greater, about 30° C. or greater, about 40° C. or greater, about 50° C. or greater, about 60° C. or greater, about 70° C. or greater, about 75° C. or greater, about 80° C. or greater, about 85° C. or greater, about 90° C. or greater, about 95° C. or greater, about 100° C. or greater, about 110° C. or greater, about 120° C. or greater, about 130° C. or greater, about 140° C. or greater, about 150° C. or greater, about 160° C. or greater, about 170° C. or greater, about 180° C. or greater, about 190° C. or greater, about 200° C. or greater, about 225° C. or greater, about 250° C. or greater, about 275° C. or greater, about 300° C. or greater, about 325° C. or greater, about 350° C. or greater, about 375° C. or greater, about 400° C. or greater, about 500° C. or greater, about 600° C. or greater, about 700° C. or greater, about 800° C. or greater, about 900° C. or greater, or about 1000° C. or greater. In one embodiment, the phase change material has a melting point, at standard conditions, of from about 30° C. to about 1000° C., from about 30° C. to about 900° C., from about 30° C. to about 800° C., from about 30° C. to about 700° C., from about 30° C. to about 600° C., from about 30° C. to about 500° C., from about 30° C. to about 400° C., from about 30° C. to about 300° C., from about 30° C. to about 200° C., from about 30° C. to about 100° C., from about 30° C. to about 75° C., from about 30° C. to about 50° C., from about 70° C. to about 1000° C., from about 70° C. to about 900° C., from about 70° C. to about 800° C., from about 70° C. to about 700° C., from about 70° C. to about 600° C., from about 70° C. to about 500° C., from about 75° C. to about 400° C., from about 80° C. to about 350° C., from about 85° C. to about 300° C., from about 90° C. to about 250° C., from about 95° C. to about 200° C., from about 100° C. to about 190° C., from about 110° C. to about 180° C., from about 110° C. to about 170° C., from about 110° C. to about 160° C., from about 110° C. to about 150° C., from about 110° C. to about 140° C., or from about 110° C. to about 130° C. In another embodiment, the phase change material has a melting point, at standard conditions, of from about 30° C. to about 1000° C., from about 40° C. to about 1000° C., from about 50° C. to about 1000° C., from about 100° C. to about 1000° C., from about 200° C. to about 1000° C., from about 300° C. to about 1000° C., from about 400° C. to about 1000° C., from about 500° C. to about 1000° C., from about 600° C. to about 1000° C., from about 700° C. to about 1000° C., from about 800° C. to about 1000° C., or from about 900° C. to about 1000° C.

For example, in certain embodiments, in a system operating with an evaporator temperature between about 60° C. and about 100° C. and a condenser temperature between about 20° C. and about 60° C., a PCM having a melting temperature of about 60° C. may be selected.

In various embodiments, the phase change material is selected from the group consisting of a sugar, a salt, and combinations thereof. For example, in one embodiment, the phase change material is selected from the group consisting of a sugar alcohol, a metal nitrate salt, and combinations thereof. In one embodiment, the phase change material is a sugar alcohol selected from the group consisting of maltitol, mannitol, isomalt, lactitol, sorbitol, and erythritol. In a further embodiment, the phase change material is sucrose. In another embodiment, the phase change material is erythritol. In yet a further embodiment, the phase change material is a metal nitrate salt selected from the group consisting of sodium nitrate, lithium nitrate, potassium nitrate, rubidium nitrate, silver nitrate, and cesium nitrate. In another embodiment, the phase change material may be selected from the group consisting of oligomers, thermoplastic polymers, hydrocarbons, metals, salts, and combinations thereof. In one embodiment, the phase change material may be ice. In certain embodiments, the phase change material may be paraffin wax. In still further embodiments, the phase change material may be selected from the group consisting of potassium cyanate, ammonium nitrate, ammonium thiocyanate, sodium acetate, sodium chlorate, potassium thiocyanate, potassium chlorate, ammonium perchlorate, sodium perchlorate, sodium bromate, potassium perchlorate, sodium chlorite trihydrate, rubidium bromide, sodium perchlorate monohydrate, potassium iodide, potassium bromate, potassium permanganate, rubidium chlorate, cesium bromide, ammonium iodate, potassium iodate, lithium perchlorate trihydrate, xylitol, rubidium perchlorate, rubidium bromate, rubidium iodide, cesium perchlorate, and cesium iodide. The most common PCM in the context of a melting-solidification phase change is paraffin wax, having a thermal conductivity of 0.37 W·m$^{-1}$·K$^{-}$.

In one embodiment, the phase change material at standard conditions is in the form of a solid. In further embodiments, the phase change material at standard conditions comprises one or more solid particles.

In some embodiments, the phase change material represents about 65 wt. % or less, about 60 wt. % or less, about 50 wt. % or less, about 45 wt. % or less, about 40 wt. % or less, about 35 wt. % or less, about 30 wt. % or less, about 25 wt. % or less, about 20 wt. % or less, about 15 wt. % or less, about 10 wt. % or less, or about 5 wt. % or less of the working fluid at standard conditions. In another embodiment, the phase change material represents about 5 wt. % or greater, about 10 wt. % or greater, about 15 wt. % or greater, about 20 wt. % or greater, about 25 wt. % or greater, about 30 wt. % or greater, about 35 wt. % or greater, about 40 wt. % or greater, about 45 wt. % or greater, about 50 wt. % or greater, about 55 wt. % or greater, or about 60 wt. % or greater of the working fluid at standard conditions. For example, in various embodiments, the phase change material represents from about 1 wt. % to about 65 wt. %, from about 1 wt. % to about 60 wt. %, from about 1 wt. % to about 55 wt. %, from about 1 wt. % to about 50 wt. %, from about 1 wt. % to about 45 wt. %, from about 1 wt. % to about 40 wt. %, from about 1 wt. % to about 35 wt. %, from about 1 wt. % to about 30 wt. %, from about 1 wt. % to about 25 wt. %, from about 1 wt. % to about 20 wt. %, from about 1 wt. % to about 15 wt. %, from about 1 wt. % to about 10 wt. %, from about 1 wt. % to about 5 wt. %, from about 1 wt. % to about 4 wt. %, from about 1 wt. % to about 3 wt. %, or from about 1 wt. % to about 2 wt. % of the working fluid at standard conditions. For example, in one embodiment, the phase change material represents from about 5 wt. % to about 50 wt. %, from about 10 wt. % to about 50 wt. %, from about 15 wt. % to about 50 wt. %, from about 20 wt. % to about 50 wt. %, from about 25 wt. % to about 50 wt. %, from about 30 wt. % to about 50 wt. %, from about 35 wt. % to about 50 wt. %, from about 40 wt. % to about 50 wt. %, or from about 45 wt. % to about 50 wt. % of the working fluid at standard conditions.

Liquid Phase Portion of the Working Fluid

The liquid phase portion of the working fluid may be any fluid suitable for use in an OHP system. As described above, it is desirable for at least a portion of the liquid phase portion of the working fluid to be capable of changing phase between liquid and vapor in the evaporator section of the OHP. The liquid phase portion of the working fluid may be chosen based on a number of factors, including whether the liquid phase portion has a high heat capacity, high thermal conductivity, low latent heat, low viscosity, and/or a vaporization temperature below the evaporator temperature and higher than the condenser temperature. In certain embodiments, the liquid phase portion of the working fluid is a liquid carrier.

For example, the liquid phase portion of the working fluid may be selected from the group consisting of water, an alcohol, an aldehyde, an alkane hydrocarbon, an aromatic hydrocarbon, and combinations thereof. In one embodiment the liquid phase portion of the working fluid is selected from the group consisting of water, methanol, ethanol, pentane, hexane, heptane, acetone, benzene, toluene, ammonia, and combinations thereof. In another embodiment, the liquid phase portion of the working fluid is water. In one embodiment, the liquid phase portion of the working fluid may comprise a liquid metal.

In some embodiments of the present invention, the solid phase portion of the working fluid comprises a phase change material capable of dissolving as a solute within the liquid phase portion of the working fluid, and the liquid phase portion comprises a solvent. The solvent may be any liquid in which the phase change material is capable of at least partially dissolving to form a solution. For example, the solvent may be selected from the group consisting of water, an alcohol, an aldehyde, an alkane hydrocarbon, an aromatic hydrocarbon, and combinations thereof. In one embodiment the solvent is selected from the group consisting of water, methanol, ethanol, pentane, hexane, heptane, acetone, benzene, toluene, and combinations thereof. In another embodiment, the solvent is water.

In some embodiments, the liquid phase portion of the working fluid represents about 30 wt. % or greater, about 40 wt. % or greater, about 50 wt. % or greater, about 60 wt. % or greater, about 70 wt. % or greater, about 75 wt. % or greater, about 80 wt. % or greater, about 85 wt. % or greater, about 90 wt. % or greater, about 95 wt. % or greater, about 96 wt. % or greater, about 97 wt. % or greater, about 98 wt. % or greater, or about 99 wt. % or greater of the working fluid at standard conditions. For example, in various embodiments, the liquid phase portion of the working fluid represents from about 30 wt. % to about 99 wt. %, from about 40 wt. % to about 99 wt. %, from about 50 wt. % to about 99 wt. %, from about 60 wt. % to about 99 wt. %, from about 70 wt. % to about 99 wt. %, from about 80 wt. % to about 99 wt. %, from about 90 wt. % to about 99 wt. %, from about 95 wt. % to about 99 wt. %, from about 96 wt. % to about 99 wt. %, from about 97 wt. % to about 99 wt. %, or from about 98 wt. % to about 99 wt. % of the working fluid at standard conditions.

In certain embodiments, the working fluid may comprise additional components. For example, metal nanoparticles, an ionic liquid, and/or a surfactant. In one embodiment, the working fluid further comprises metal nanoparticles that comprise graphite and/or nickel. In another embodiment, the working fluid further comprises expanded graphite (EG).

Numerous combinations of the solid phase change material and liquid phase component may be made to form an acceptable working fluid of the present invention. In one example, the phase change material is paraffin wax and the liquid phase component comprises water. The working fluid comprises 5% paraffin wax and 95% water and the OHP is charged with the working fluid at a fill ratio of 50 vol % working fluid and 50 vol % vapor. The OHP diameter can be from about 0.05 mm to about 5.00 mm. The surfaces of the OHP can also be nanostructured to create a hydrophilic surface in the evaporator and a hydrophobic surface in the condenser. This OHP system would exhibit enhanced heat transfer when the evaporator temperature is between about 20° C. and about 317° C. and the condenser temperature is between about 0° C. and about 68° C.

In one embodiment, the present invention provides a 3-phase oscillating heat pipe. The working fluid in the OHP consists of phase change material (PCM) and water. During the operation, the PCM changes the phase between solid and liquid, and water changes phase between liquid and vapor. In one embodiment the PCM is erythritol, with an instant cooling effect when dissolved in water due to the latent heat of 340 J/g. The PCM solid phase of the working fluid can become a liquid phase in the evaporator and the PCM liquid phase of the working fluid can become a solid phase in the condenser.

For high temperature/high heat flux applications, such as in the leading-edge of hypersonic vehicles, metals such as caesium, potassium, sodium, and lithium may be used as the liquid phase of the working fluid and other high temperature metals or high temperature salts can be used as the phase change material which undergoes a phase change from solid to liquid by melting/dissolution. Heat fluxes experienced in these applications are on the order of 1,500 W/cm$^2$, with an evaporator temperature of approximately 2,000° C.

The OHP of the present invention may exhibit enhanced results over previous heat pipes. For example, in one embodiment, the heat transfer performance of the oscillating heat pipe is about 5% or greater, about 6% or greater, about 7% or greater, about 8% or greater, about 9% or greater, or about 10% or greater than that of a comparable oscillating heat pipe containing a working fluid of water. In another embodiment, the thermal resistance of the oscillating heat pipe is about 15% or lower, about 10% or lower, or about 5% or lower than that of a comparable oscillating heat pipe containing a working fluid of water.

Experiment Description

The effects of heat input ranging from 100 to 420 W, the effects of erythritol concentration ranging from 1 wt % to 50 wt % on the slug oscillations, and the OHP heat transfer performance were investigated. Experimental results showed that while erythritol can help to increase the heat transfer performance of an OHP, the heat transfer performance depends on the erythritol concentration. With a range of 1-5 wt % concentration of erythritol/water mixtures, a maximum 10% increase in the heat transfer performance was observed. When the erythritol concentration of erythritol/water mixtures was increased to a range of 10-50 wt %, the heat transfer performance of OHPs was lower than pure water-filled OHP, and the heat transfer performance decreased as the erythritol concentration was further increased. In addition, visualization results showed that slug oscillation amplitudes and velocities were reduced in the OHPs with erythritol solution compared to water-filled OHP.

Experimental setup. The experimental setup, as seen in FIG. 3, consists of an OHP, heating and cooling systems, and a data acquisition system. The OHP with six turns was manufactured on a 130×80×10 mm$^3$ copper plate. The cover plate of the OHP was a transparent polycarbonate (PC) plate used for visualization. Channels with a 2×2 mm$^2$ cross section were machined into the copper plate to manufacture the OHP. The length of the OHP was 106 mm with evaporation, adiabatic, and condensation section lengths of 28, 42, and 36 mm, respectively. Details of configuration parameters of the OHP are summarized in Table 1. The cover and base plates of OHP were fastened by bolts, and a high temperature silicone rubber sheet was used for sealing. Photo and exploded view of the tested oscillating heat pipe are shown in FIG. 4. Teflon insulation blocks are installed on the heating and cooling blocks and insulation material layers are covered around the OHP to prevent heat loss. The OHP is working in a vertical direction. The evaporator was made of a 63×33 mm$^2$ copper block. Four cartridge heaters with the highest heat power of 600 W were inserted into the holes in the copper block. The condenser was made of a 115×38 mm$^2$ aluminum block. The evaporator block, condenser block and OHP were fastened by bolts with a thin film thermal conductive Omegatherm 201 silicon grease to reduce thermal contact resistance. The Agilent N5750A DC System Power Supply was connected to the four cartridge heaters to supply the heat to the OHP. The JULABO F34-ME refrigerated/heating circulator circulated the cooling water at a constant temperature of 15° C. to remove the heat from the condenser. The heating input varied from 100 W to 420 W with an increment of 40 W. When the heat input was added in the evaporator, about 20 minutes were needed for the OHP to reach steady state. Images of the slug motions in the OHP at steady state were captured by a Sony DSC-RX100 V digital camera at 100 fps.

TABLE 1

Configuration parameters of the copper plate OHP

| Parameter | Value |
| --- | --- |
| Turn number | 6 |
| Total heat transfer length | 106 |

TABLE 1-continued

Configuration parameters of the copper plate OHP

| Parameter | Value |
| --- | --- |
| Evaporator length (mm) | 28 |
| Adiabatic section length | 42 |
| Condenser length (mm) | 36 |
| Cross section (mm$^2$) | 2 × 2 |
| Total channel length (mm) | 1257 |

A 901P Loadlock vacuum pressure transducer (MKS Instruments, Inc., USA) was connected to the OHP to measure the inner pressure. In the charging process, the system consisted of a vacuum pump, a vacuum manometer, and a syringe. First, valve 1 was opened and valve 2 was closed during the vacuum supply. Second, when the inner pressure of the OHP was lower than 0.3 Torr, valve 1 closed and valve 2 opened; working fluid in the syringe was pumped into the OHP due to the vacuum. The volume of the charging fluid was controlled through the syringe. Filling ratios of OHPs were around 70%±5% by weight. Deionized water and erythritol aqueous solution were selected as the working fluid. Erythritol, as the phase change material, was added to deionized water to be used as the working fluid. The erythritol aqueous solutions were prepared with concentrations of 1, 5, 10, 25, 35, 40, 45, and 50 wt %. The mass concentrations of erythritol in aqueous solutions were determined using an OHAUS Explorer EX1103 analytical balance with up to 0.001 g readability.

Data reduction and uncertainty analysis. Six thermocouple holes with 1.5 mm diameter were drilled into the copper plate on each side of the OHP. A total of 12 T-thermocouples (±1° C.) were inserted into the thermocouple holes to measure the OHP temperature variation. Temperature data was collected by a NI SCXI-1000 data acquisition system at a rate of 100 Hz. The temperatures are noted by $T_1$ to $T_4$ and $T_9$ to $T_{12}$ in the evaporation and condensation sections, respectively. The thermal resistance of the OHP is calculated by $$R = \frac{T_e - T_c}{Q_e} \quad (1)$$

where $T_e$ is the average surface temperature in the evaporator obtained by $$T_e = \frac{T_1 + T_2 + T_3 + T_4}{4}.$$

$T_c$ is the average surface temperature in the condenser determined by $$\overline{T}_c = \frac{T_9 + T_{10} + T_{11} + T_{12}}{4},$$

and $Q_e=U\times I$, where U and I are the voltage and current from the DC power. The effective thermal conductivity of OHP is determined by:

$$k_{eff} = \frac{L_{eff}}{R \cdot A} \quad (2)$$

where $L_{eff}$ is the effective length, and A is the cross sectional area of the OHP.

The maximum output voltage and current of the N5750A DC power is 150±0.15 V and 5±0.015. The relative uncertainty of the input power is calculated by $$\frac{\delta Q}{Q} = \sqrt{\left(\frac{\delta U}{U}\right)^2 + \left(\frac{\delta I}{I}\right)^2} \quad (3)$$

The relative uncertainty of thermal resistance is determined by $$\frac{\delta R}{R} = \sqrt{\left(\frac{\delta T_e}{T_e - T_c}\right)^2 + \left(\frac{\delta T_c}{T_e - T_c}\right)^2 + \left(\frac{\delta Q}{Q}\right)^2} \quad (4)$$

At the heat input of 100-420 W, the temperature difference between evaporator and condenser is 20-40° C. The relative uncertainty of the input power is 0.40%-0.81%. The relative uncertainty of thermal resistance is 3.56%-7.12%.

Thermal properties of working fluids. A number of the phase change materials, as shown in Table 2, were tested. It was found that erythritol can enhance heat transfer in the OHP of the present invention. Therefore, erythritol was used and is reported herein. The main thermo-physical parameters of the working fluid are summarized in Table 3. It can be seen that erythritol has a latent heat of 340 J/g, a low specific heat and low thermal conductivity. Compared with pure water, the vapor pressure of erythritol aqueous solution is reduced, and the vapor pressure decreases as the erythritol concentration increases. At 60° C., the viscosity of the solution with a 30 wt % concentration is 6.48 times higher than that of pure water. The solubility of erythritol rises greatly as the temperature increases. At an erythritol concentration lower than 25 wt %, erythritol can completely dissolve in water at a room temperature of 20° C. The saturated temperature of the erythritol solution with concentrations of 35, 40, 45, and 50 wt % studied in this work are about 25, 30, 35, and 40° C. Erythritol concentration has a great effect on the viscosity of an erythritol aqueous solution. Viscosity of the solution increases as the concentration increases.

During the operation of this three-phase OHP, erythritol changes phase between solid and liquid, and the water changes phase between liquid and vapor when water containing erythritol oscillates between the evaporator and condenser, as shown in FIG. 1. The erythritol dissolvability depends on temperature. During the operation, the evaporator temperature is higher than the temperature of the saturated solution while the condenser temperature is lower than the temperature of the saturated solution. As a result, when the working fluid is in the condenser, small particles of erythritol were formed, which is similar to the small particles nucleation in the oscillatory crystallizer. When the working fluid with small nucleated particles of erythritol move back to the evaporator by the slug oscillations. Those small particles in solid phase were dissolved in the solvent water. During the normal operation of oscillating movements between condenser and evaporator, small solid particles were generated in the condenser and dissolved in the evaporator repeatedly. Adding erythritol can significantly increase the viscosity of the fluid; thus, the flow resistance of slugs in the channel rises as the erythritol concentration increases. The low thermal conductivity and high viscosity of working fluid play a negative role on the heat transfer performance of OHPs. The working fluids of erythritol concentration, ranging from 1 wt % to 50 wt %, were investigated for the achievement of optimal erythritol concentration to further enhance heat transfer of OHPs. For the OHPs charged with erythritol solution described herein, the working fluid can absorb and release more heat during the phase change process due to the high fusion heat, which can increase the heat transport capability. However, when erythritol is dissolved into water, the specific heat and thermal conductivity of the fluid reduces, and the viscosity of the fluid increases.

TABLE 2

Properties of sugar alcohols and sucrose

| Sugar | Melting temperature (° C.) | Latent heat of fusion (kJ/kg) | Viscosity (mPa · s), 60 wt % solution |
|---|---|---|---|
| Sorbitol | 99 | 174.3 | ~30 at 25° C. |
| Maltitol | 152 | 168.6 | ~70 at 30° C. |
| Erythritol | 391.2 | 340 | ~10 at 60° C. |
| Sucrose | 190 | 18 | ~50 at 25° C. |

TABLE 3

Thermal properties of water, erythritol, and erythritol solution

| Property | Water (20° C.) | Erythritol | Erythritol aqueous solution |
|---|---|---|---|
| Molecular weight (g/mol) | 18 | 122.12 | |
| Melting point (° C.) | 0 | 119-122 | |
| Boiling point (° C.) | 100 | 329-331 | |
| Vapor pressure (44.84° C.)/kPa | 9.5140 | — | 8.8829 for a 30% w/w Solution |
| Specific heat ($kJ \cdot kg^{-1} \cdot K^{-1}$) | 4.182 | 2.76 (fluid at 140° C.) 1.38 (solid at 20° C.) | |
| Density ($g \cdot cm^{-3}$) | 0.999 | 1.45 | |
| Thermal conductivity ($W \cdot m^{-1} \cdot °C.^{-1}$) | 0.602 | 0.326 (fluid) 0.733 (solid at 20° C.) | |
| Viscosity (mPa · s) | 1.0015 (20° C.) 0.463 (60° C.) | — | 3 mPa · s at 60° C. for a 30% w/w Solution |
| Surface tension ($N \cdot m^{-1}$) | 0.07288 | — | |
| Latent heat of fusion (kJ/kg) | — | 340 | |

Results and Discussion

Figure 6:
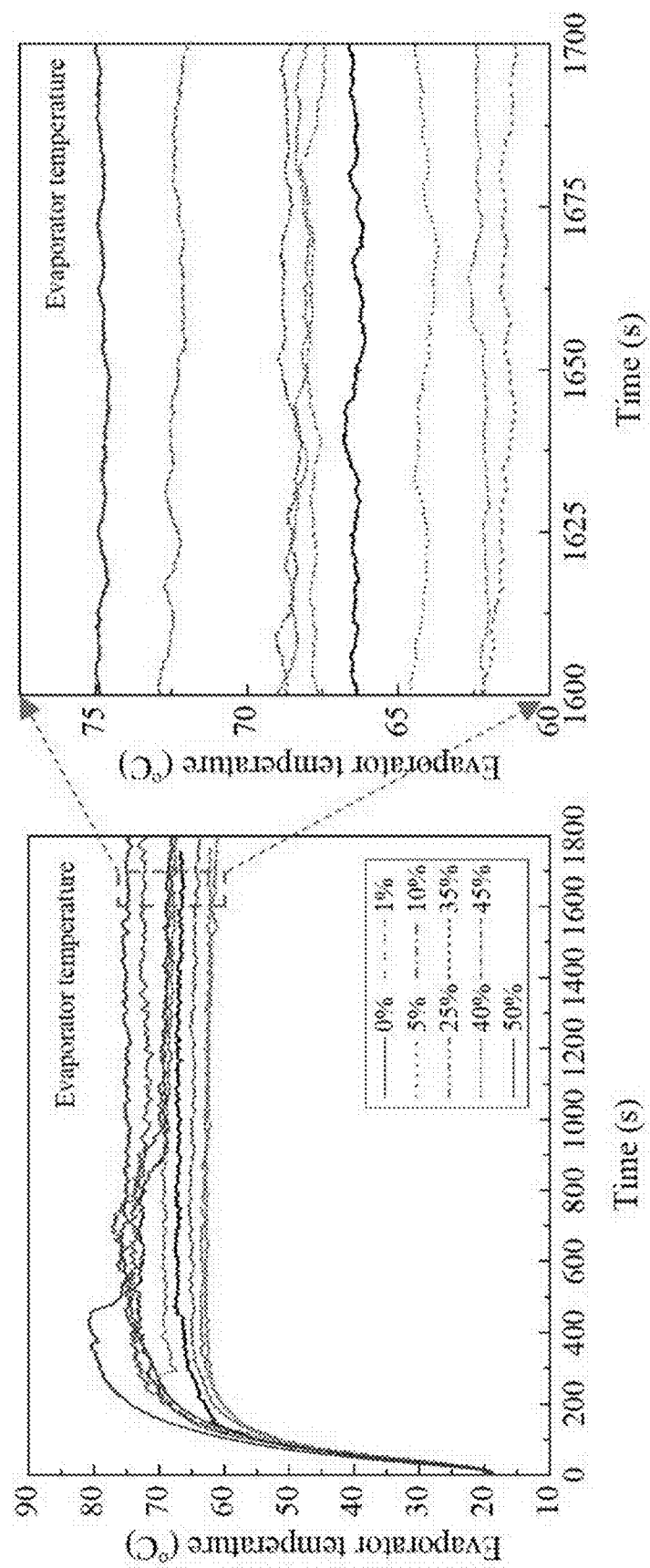
FIG. 6 is a graphical illustration of OHP evaporator temperature oscillation curves with a working fluid of 0-50 wt % erythritol (Heat input: 260 W), in accordance with various embodiments of the present disclosure.

Temperature curves. OHPs charged with erythritol solution with mass concentrations of 1 wt %-50 wt % were studied through visualization and heat transfer experiments. Saturated temperatures of the erythritol solution increased as the erythritol concentration increased. At low concentrations between 1 wt % and 25 wt %, the erythritol can dissolve completely in water at a room temperature of 20° C. At high concentrations between 35% and 50%, solid erythritol exists in solution at a room temperature of 20° C. After charging the hybrid fluids, OHPs were tested at a heat input of 260 W. The OHPs operated satisfactorily, with the slug oscillations and the erythritol's gradual dissolution permitting flow of the working fluid. The evaporator temperature curves of OHPs with different erythritol concentrations at the heat input of 260 W are illustrated in FIG. 6. Temperatures increased sharply until 300 s and then tended to be constant. At concentrations between 35 and 50 wt %, evaporation temperature curves had a sharp temperature drop due to the full dissolution of erythritol. The evaporator temperatures in the erythritol concentrations between 1 and 5 wt % were lower than that of the water-filled OHP; whereas, the evaporator of OHPs with the erythritol concentrations between 25 and 50 wt % were higher than that of the water-filled OHP at steady state. The thermal resistances of the nine OHPs at steady state with erythritol concentrations of 0, 1, 5, 10, 25, 35, 40, 45, and 50 wt % were 0.100, 0.085, 0.094, 0.097, 0.102, 0.111, 0.118, 0.120, 0.140, respectively. The thermal resistance of the 1 wt % erythritol solution OHP was 15% lower than that of the water OHP.

Figure 7:
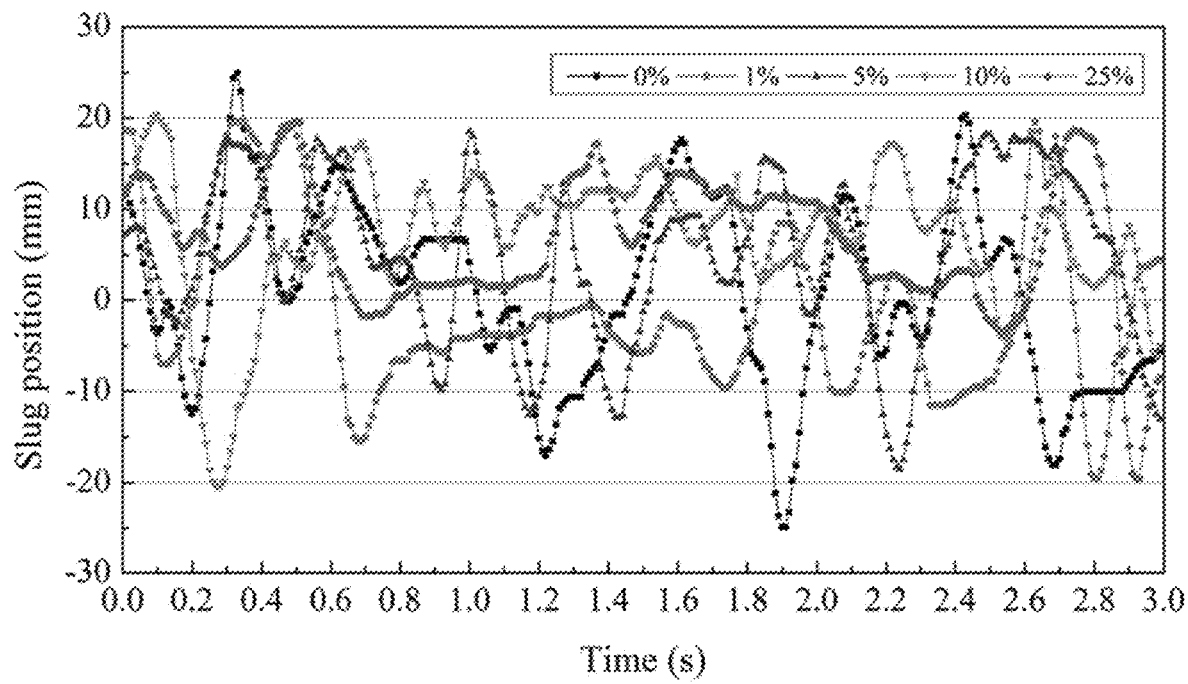
FIG. 7 is a graphical illustration of the effect of erythritol solution concentration on the slug oscillation positions in OHPs (heat input: 140 W), in accordance with various embodiments of the present disclosure.
Figure 7:
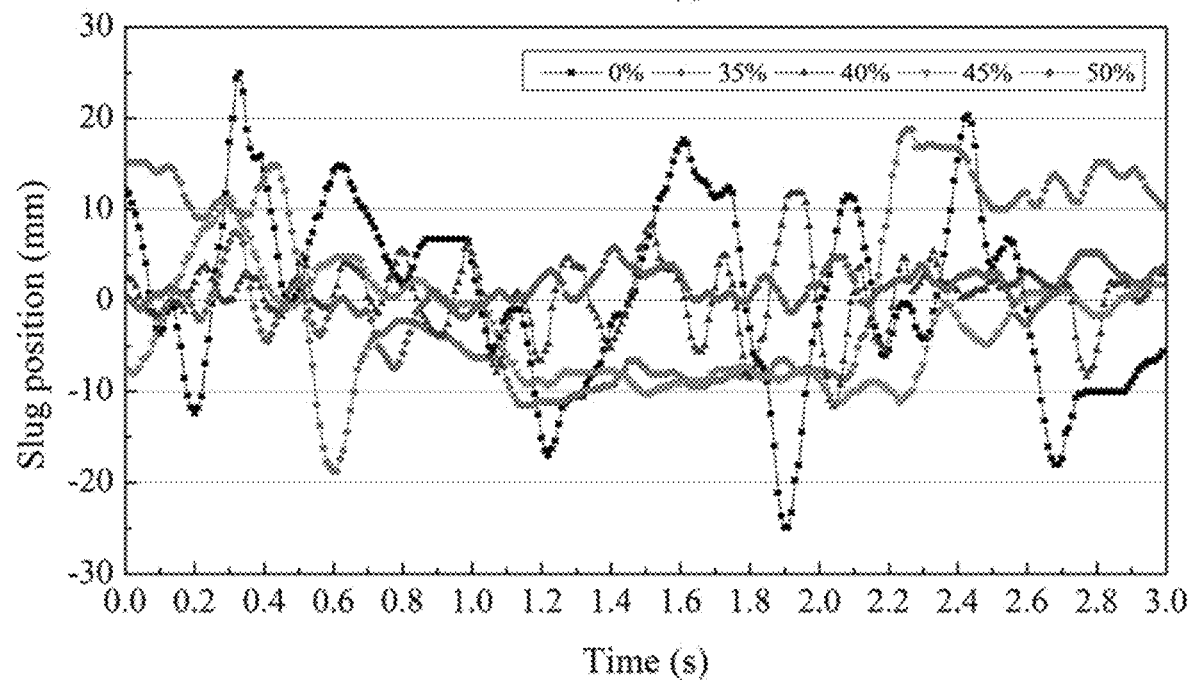
Figure 8:
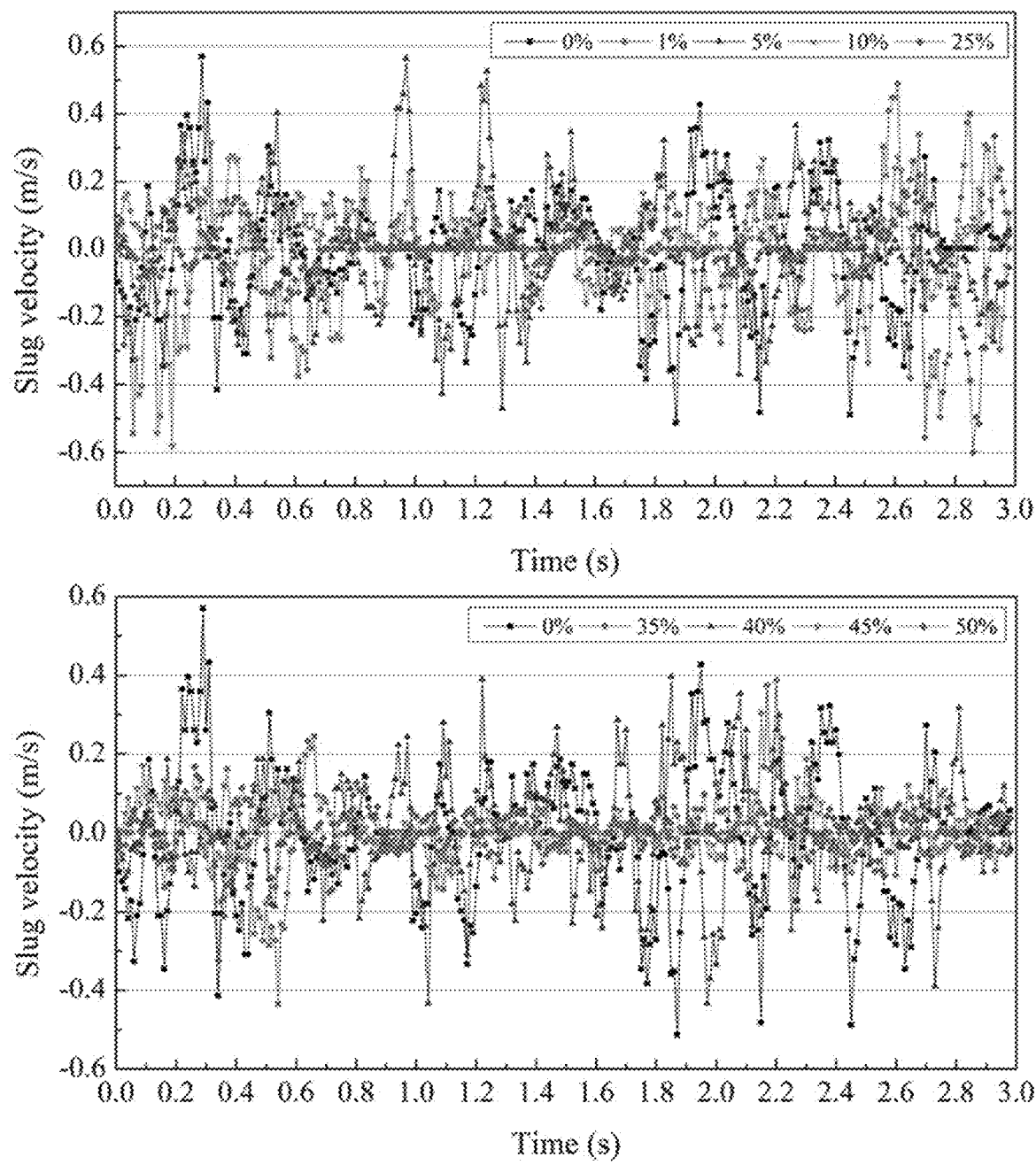
FIG. 8 is a graphical illustration of the effect of erythritol solution concentration on the slug oscillation velocities in OHPs (Heat input: 140 W), in accordance with various embodiments of the present disclosure.
Figure 9:
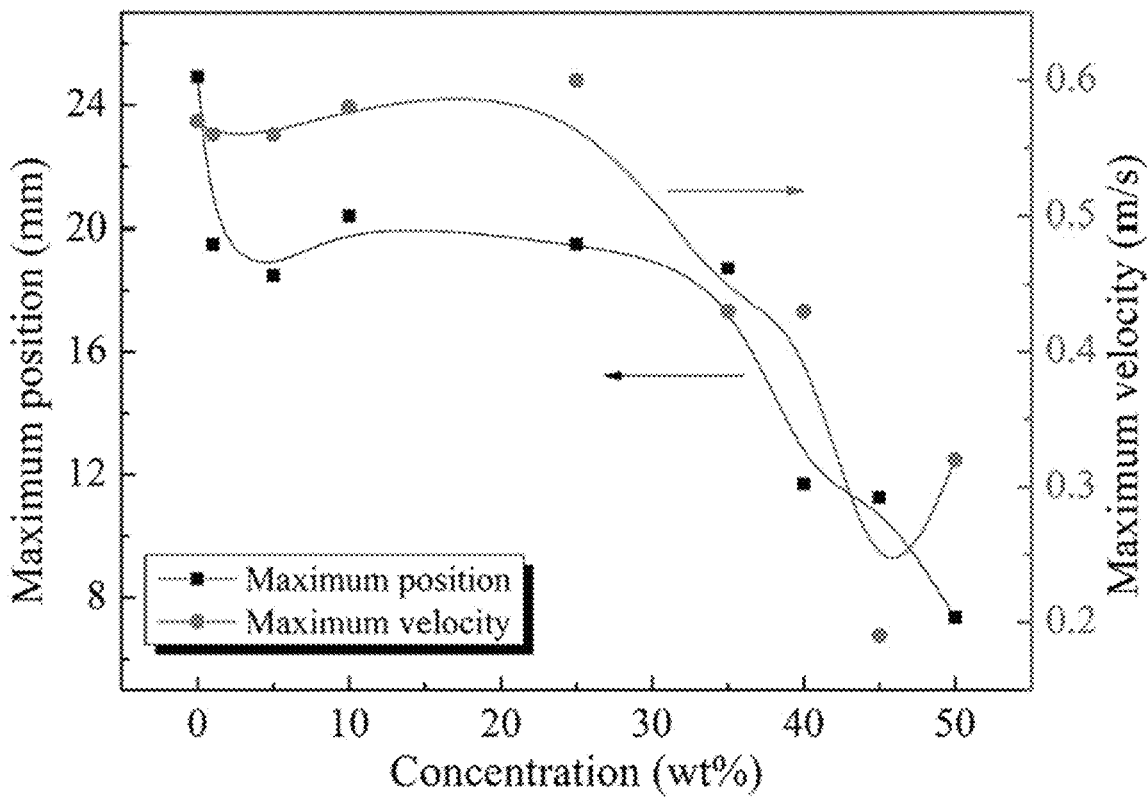
FIG. 9 is a graphical illustration of maximum positions and velocities of liquid slug oscillation with various erythritol concentration at a heat input of 140 W, in accordance with various embodiments of the present disclosure.

Oscillating motions of liquid slugs. Liquid slug oscillations were taken when the OHP reached the steady state and analyzed using Image Pro-Plus software (Media Cybernetics, Inc., Rockville, MD, USA). The OHP was working in a vertical direction with bottom heating. The heating input varied from 100 W to 420 W with an increment of 40 W. The minimum start-up power of OHPs of this experiment was 140 W. When OHPs begin operation, vapor expansion and contraction in the evaporator and condenser, and the pressure difference and gravity are the driving force producing oscillating motion between evaporator and condenser. At a power input of 140 W, steady state oscillating motions were generated as shown in FIGS. 7 and 8. The maximum amplitude of the slug was defined as the maximum deviation from the time averaged position. FIG. 9 illustrates the maximum position and velocity of liquid slug oscillation. The slug oscillation amplitudes and velocities in the OHPs with erythritol concentrations between 1 and 25 wt % were slightly lower than the ones in the water-filled OHP. However, at erythritol concentrations between 35 and 50 wt %, the slug oscillation amplitudes and velocities greatly decreased. The weaker movement of liquid slugs can be basically attributed to the increasing viscosity of the solution and decreasing vapor pressure. Erythritol concentrations had a great effect on the viscosity of the solution. At the mass concentration of 50 wt %, the viscosity of erythritol solution was about 8 mPa·s, which is 17 times higher than water at a temperature of 60° C. Flow resistance increased as the solution viscosity increased. Moreover, the vapor pressure of erythritol solution was lower than that of water, and the vapor pressure decreased as the erythritol concentration increased, resulting in a lower driving force. Due to the increasing of flow resistance and decreasing of driving force, the slug oscillations became weaker in the OHPs with erythritol solution as the working fluid.

Figure 10:
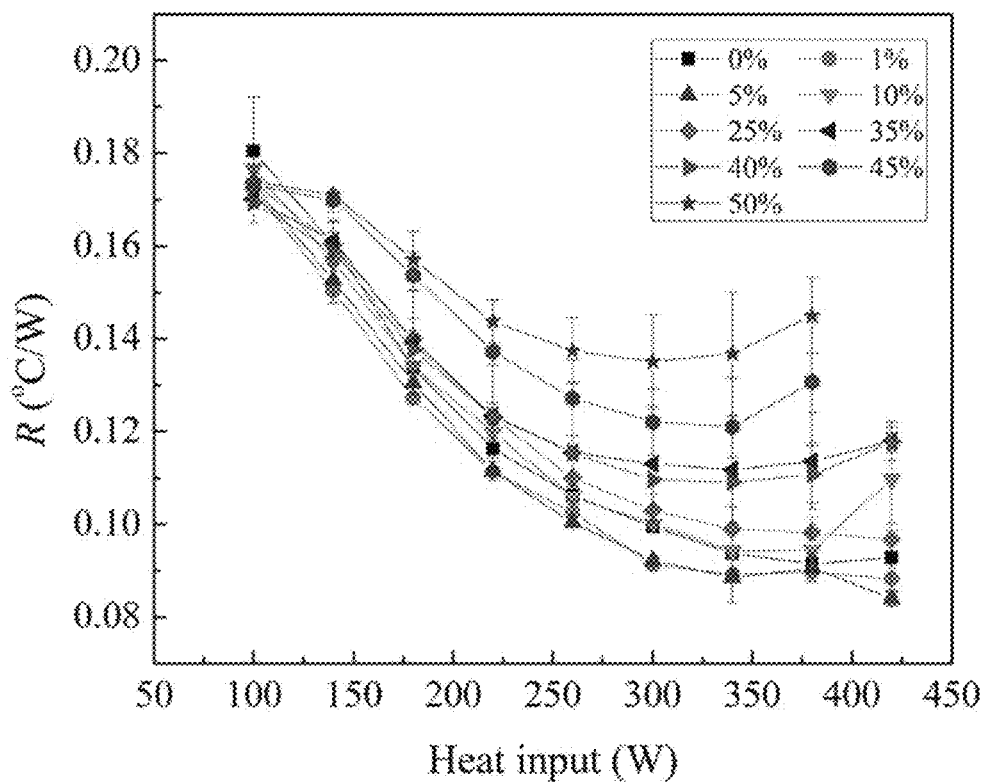
FIG. 10 is a graphical illustration of thermal resistances of OHPs with different erythritol solution concentrations, in accordance with various embodiments of the present disclosure.

Heat transfer performance. FIG. 10 shows the effect of erythritol concentration on the thermal resistance of OHPs.

It was observed that the thermal resistance decreased as the heat input increased for the water-filled OHP. The experiments were repeated three times to ensure the accuracy of the experiment. The thermal resistance of OHPs with the erythritol concentration of 1 wt % and 5 wt % was lower than that of water-filled OHPs. Compared to water-filled OHPs, the OHP with a low erythritol concentration of 1% to 5% exhibited higher heat transfer performance. The enhancement averaged an increase of about 5% with a maximum increase of 10% in heat transfer performance. This improvement was observed with 1% and 5% concentrations of erythritol/water mixtures. It can be found from Table 2 that the fusion heat of erythritol was 340 kJ/kg. The adding of erythritol could increase the heat transport capacity of fluid. More heat was absorbed and released in the evaporator and condenser within the erythritol solution. However, at the erythritol concentration of 10 to 50 wt %, the thermal resistances of OHPs were higher than that of water-filled OHPs, and the thermal resistance increased as the erythritol concentration increased. The heat transfer performance of OHPs mainly depended on the sensible heat transfer of slug oscillations. The slug oscillation amplitudes and velocities decreased greatly in the OHPs with high erythritol concentrations under the high viscosity, as shown in FIGS. 7 and 8. Moreover, the specific heat of pure erythritol was lower than water. In this case, the high viscosity and low specific heat of erythritol solution were the main limiting factors for heat transfer performance of OHPs, resulting in a higher thermal resistance. At low erythritol concentrations (1-5 wt %), added erythritol had a minor effect on the properties of water. OHPs with the working fluid of low erythritol concentration (1-5 wt %) showed a better heat transfer performance. The reduction of thermal resistance was observed with an erythritol concentration of 1-5 wt % due to the high fusion heat of erythritol. At a high erythritol concentration, the slug movements became weaker, resulting a high evaporation temperature of OHPs. Especially, at erythritol concentrations between 45% and 50% (saturated solution of 35 to 40° C.), some erythritol was undissolved in the condenser section due to the low surface temperature, resulting in the state of vapor-liquid-solid coexistence in OHPs.

CONCLUSIONS

Oscillating motions and heat transfer performance of OHPs with hybrid fluids consisting of phase change material (erythritol) and water mixtures under different heat inputs and erythritol concentrations were experimentally investigated. Adding a small amount of erythritol in water (1-5 wt %) could increase the heat transport capacity of fluid and improve the heat transfer performance of OHP due to the high fusion heat. Limited by the low thermal conductivity and high viscosity of the erythritol solution, heat transfer performance enhancement was observed only in the low erythritol concentration. Compared to the OHPs charged with pure water, the enhancement of OHPs charged with 1-5 wt % erythritol solution averaged an increase of about a 5% and a maximum 10% increase in heat transfer performance. The OHPs with high erythritol concentrations (10-50 wt %) exhibited a higher thermal resistance. In addition, it was observed that the amplitude and velocity of the slug oscillations decreased with the addition of erythritol into water.

The above description is merely exemplary in nature and is in no way intended to limit the present teachings, application, or uses. Throughout this specification, like reference numerals are used to refer to like elements. Additionally, the embodiments disclosed above are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described above are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

What is claimed:

1. An oscillating heat pipe system comprising:
   a pipe defining a heat pipe channel comprising an adiabatic section, an evaporator section in thermal contact with an evaporator, and a condensation section in thermal contact with a condenser; and
   a working fluid disposed within the heat pipe channel;
   wherein the working fluid disposed within the heat pipe channel in the adiabatic section comprises a solid phase change material, a liquid carrier, and a vapor;
   wherein the working fluid absorbs thermal energy in the evaporator section, thereby heating the working fluid, at least a portion of the solid phase change material changes state to a liquid phase change material, and at least a portion of the liquid carrier evaporates and forms vapor; and
   wherein the working fluid releases thermal energy in the condensation section, thereby cooling the working fluid, at least a portion of the vapor condenses, and at least a portion of the liquid phase change material solidifies.

2. The system of claim 1, wherein the liquid carrier in the working fluid disposed within the heat pipe channel comprises a solvent;
   wherein upon heating the working fluid in the evaporator section, at least a portion of the solid phase change material dissolves in the solvent as a solute, the liquid phase change material comprising the solute; and
   wherein upon cooling the working fluid in the condensation section, at least a portion of the solute precipitates as a solid in the heat pipe channel.

3. The system of claim 1, wherein upon heating the working fluid in the evaporator section, at least a portion of the solid phase change material melts to form the liquid phase change material; and
   wherein upon cooling the working fluid in the condensation section, at least a portion of the liquid phase change material in the heat pipe channel is solidified.

4. The system of claim 1, wherein the phase change material has a melting point, at standard conditions, of about 25° C. or greater.

5. The system of claim 2, wherein the phase change material is selected from the group consisting of a sugar alcohol, a metal nitrate salt, and combinations thereof.

6. The system of claim 5, wherein the sugar alcohol is selected from the group consisting of maltitol, mannitol, isomalt, lactitol, sorbitol, and erythritol.

7. The system of claim 6, wherein the sugar alcohol is erythritol.

8. The system of claim 5, wherein the metal nitrate salt is selected from the group consisting of sodium nitrate, lithium nitrate, potassium nitrate, rubidium nitrate, silver nitrate, and cesium nitrate.

9. The system of claim 3, wherein the phase change material is selected from the group consisting of oligomers, thermoplastic polymers, hydrocarbons, metals, salts, and combinations thereof.

10. The system of claim 9, wherein the phase change material is paraffin wax.

11. The system of claim 1, wherein, at standard conditions, the phase change material is in the form of a solid.

12. The system of claim 1, wherein the phase change material represents from about 1 wt. % to about 65 wt. % of the working fluid at standard conditions.

13. The system of claim 1, wherein the working fluid further comprises metal nanoparticles, an ionic liquid, and/or a surfactant.

14. The system of claim 13, wherein the metal nanoparticles comprise graphite and/or nickel.

15. The system of claim 1, wherein the liquid carrier is selected from the group consisting of water, an alcohol, an aldehyde, an alkane hydrocarbon, an aromatic hydrocarbon, and combinations thereof.

16. The system of claim 2, wherein the solvent is selected from the group consisting of water, methanol, ethanol, pentane, hexane, heptane, acetone, benzene, toluene, and combinations thereof.

17. The system of claim 1, wherein the liquid carrier represents from about 30 wt. % to about 99 wt. % of the working fluid.

18. The system of claim 1, wherein the heat transfer performance of the oscillating heat pipe system of claim 1 is about 5% or greater than that of a comparable oscillating heat pipe system, wherein the comparable oscillating heat pipe system comprises:
   a pipe defining a heat pipe channel comprising an adiabatic section, an evaporator section in thermal contact with an evaporator, and a condensation section in thermal contact with a condenser and a working fluid disposed within the heat pipe channel;
   wherein the working fluid comprises water;
   wherein the working fluid absorbs thermal energy in the evaporator section, thereby heating the working fluid; and
   wherein the working fluid releases thermal energy in the condensation section, thereby cooling the working fluid.

19. A process for preparing an oscillating heat pipe comprising:
   preparing a plurality of interconnected heat pipe channels comprising an adiabatic section, an evaporator section in thermal contact with an evaporator, and a condensation section in thermal contact with a condenser,
   applying pressure to form at least a partial vacuum within the plurality of channels, wherein the pressure within the channels is about 0.3 Torr or less, and
   charging a working fluid into the plurality of channels;
   wherein the working fluid disposed within the heat pipe channels in the adiabatic section comprises a solid phase change material, a liquid carrier, and a vapor; and wherein upon heating the working fluid in the evaporator section, thermal energy is absorbed and at least a portion of the solid phase change material changes state to a liquid phase change material, and at least a portion of the liquid carrier evaporates and forms a vapor; and wherein upon cooling the working fluid in the condensation section, thermal energy is released and at least a portion of the vapor condenses, and at least a portion of the liquid phase change material precipitates/solidifies as a solid.

* * * * *